United States Patent
Solihin

(10) Patent No.: US 10,289,452 B2
(45) Date of Patent: May 14, 2019

(54) THREAD AND DATA ASSIGNMENT IN MULTI-CORE PROCESSORS BASED ON CACHE MISS DATA AND THREAD CATEGORY

(71) Applicant: EMPIRE TECHNOLOGY DEVELOPMENT LLC, Wilmington, DE (US)

(72) Inventor: Yan Solihin, Raleigh, NC (US)

(73) Assignee: Empire Technology Development, LLC, Wilmington, DE (US)

( * ) Notice: Subject to any disclaimer, the term of this patent is extended or adjusted under 35 U.S.C. 154(b) by 0 days.

(21) Appl. No.: 15/495,126

(22) Filed: Apr. 24, 2017

(65) Prior Publication Data

US 2017/0228259 A1 Aug. 10, 2017

Related U.S. Application Data

(63) Continuation of application No. 14/758,404, filed as application No. PCT/US2014/019052 on Feb. 27, 2014, now Pat. No. 9,632,832.

(51) Int. Cl.
*G06F 9/50* (2006.01)
*G06F 9/48* (2006.01)
(Continued)

(52) U.S. Cl.
CPC .......... *G06F 9/5033* (2013.01); *G06F 9/4881* (2013.01); *G06F 11/34* (2013.01); *G06F 12/0806* (2013.01); *G06F 12/0811* (2013.01); *G06F 12/0813* (2013.01); *G06F 12/0875* (2013.01); *G06F 2201/885* (2013.01); *G06F 2209/5018* (2013.01);
(Continued)

(58) Field of Classification Search
None
See application file for complete search history.

(56) References Cited

U.S. PATENT DOCUMENTS 7,487,317 B1 2/2009 Fedorova et al.
7,509,484 B1 3/2009 Golla et al.
(Continued)

FOREIGN PATENT DOCUMENTS

EP 2472398 A1 7/2012

OTHER PUBLICATIONS

Extended European Search Report for European Application No. 14884199.2 dated Oct. 12, 2017, pp. 8.
(Continued)

*Primary Examiner* — Abu Ghaffari

(57) ABSTRACT

Methods and systems to assign threads in a multi-core processor are disclosed. A method to assign threads in a multi-core processor may include determining data relating to memory controllers fetching data in response to cache misses experienced by a first core and a second core. Threads may be assigned to cores based on the number of cache misses processed by respective memory controllers. Methods may further include determining that a thread is latency-bound or bandwidth-bound. Threads may be assigned to cores based on the determination of the thread as latency-bound or bandwidth-bound. In response to the assignment of the threads to the cores, data for the thread may be stored in the assigned cores.

18 Claims, 7 Drawing Sheets

(51) Int. Cl.
  *G06F 12/0806* (2016.01)
  *G06F 12/0875* (2016.01)
  *G06F 12/0811* (2016.01)
  *G06F 12/0813* (2016.01)
  *G06F 11/34* (2006.01)

(52) U.S. Cl.
  CPC ............... *G06F 2212/1016* (2013.01); *G06F 2212/1021* (2013.01); *G06F 2212/1024* (2013.01); *G06F 2212/62* (2013.01)

(56) References Cited

U.S. PATENT DOCUMENTS

| | | | |
|---|---|---|---|
| 7,761,572 B1* | 7/2010 | Auerbach | H04L 29/06 370/235 |
| 7,818,747 B1 | 10/2010 | Fedorova et al. | |
| 8,037,250 B1 | 10/2011 | Barreh et al. | |
| 8,095,735 B2 | 1/2012 | Brewer et al. | |
| 8,180,981 B2 | 5/2012 | Kapil et al. | |
| 8,200,901 B1 | 6/2012 | Wentzlaff et al. | |
| 8,234,451 B1 | 7/2012 | Agarwal et al. | |
| 8,667,493 B2 | 3/2014 | Chung et al. | |
| 8,738,860 B1 | 5/2014 | Griffin et al. | |
| 8,782,649 B2* | 7/2014 | Jeong | G06F 9/4881 718/100 |
| 8,898,390 B2* | 11/2014 | Jiang | G06F 9/46 711/118 |
| 9,009,719 B2* | 4/2015 | Ramteke | G06F 9/5033 718/1 |
| 9,063,825 B1 | 6/2015 | Bao | |
| 9,390,031 B2 | 7/2016 | Durham et al. | |
| 9,514,051 B2* | 12/2016 | Zhao | G06F 12/084 |
| 9,665,375 B2* | 5/2017 | Chou | G06F 9/3861 |
| 2004/0019891 A1* | 1/2004 | Koenen | G06F 9/5044 718/102 |
| 2005/0071564 A1* | 3/2005 | Luick | G06F 12/0806 711/121 |
| 2006/0026594 A1 | 2/2006 | Yoshida et al. | |
| 2007/0285439 A1 | 12/2007 | King et al. | |
| 2008/0168239 A1 | 7/2008 | Shen et al. | |
| 2009/0064164 A1* | 3/2009 | Bose | G06F 1/206 718/105 |
| 2011/0067029 A1 | 3/2011 | Wolfe et al. | |
| 2011/0219208 A1 | 9/2011 | Asaad et al. | |
| 2011/0246995 A1 | 10/2011 | Fedorova et al. | |
| 2011/0289257 A1 | 11/2011 | Hathaway et al. | |
| 2012/0079491 A1* | 3/2012 | Chung | |
| 2012/0102269 A1* | 4/2012 | Ono | G06F 12/0862 711/122 |
| 2012/0102500 A1 | 4/2012 | Waddington et al. | |
| 2012/0102501 A1 | 4/2012 | Waddington et al. | |
| 2012/0137075 A1* | 5/2012 | Vorbach | G06F 9/526 711/122 |
| 2012/0167113 A1* | 6/2012 | Levin | G06F 9/5016 718/104 |
| 2013/0019069 A1* | 1/2013 | Yamashita | G06F 9/5016 711/149 |
| 2014/0108828 A1* | 4/2014 | Breternitz | G06F 1/329 713/300 |
| 2015/0007187 A1* | 1/2015 | Shows | G06F 9/5088 718/104 |
| 2015/0089159 A1 | 3/2015 | Busaba et al. | |
| 2015/0193343 A1* | 7/2015 | Elias | G06F 12/0806 711/119 |

OTHER PUBLICATIONS

Duong, N., et al., "Improving Cache management Policies Using Dynamic Reuse Distances," Proceedings of the 45th Annual IEEE/ACM International Symposium on Microarchitecture, pp. 389-400 (Dec. 1-5, 2012).

Harizopoulos, S., and Ailamaki, A., "Improving Instruction Cache Performance in OLTP," ACM Transactions on Database Systems (TODS) vol. 31, Issue 3, pp. 887-920 (Sep. 2006).

International Search Report and Written Opinion for International Application No. PCT/US2014/019052 dated Sep. 10, 2014, pp. 10.

Kim, Y., et al., "ATLAS: A Scalable and High-Performance Scheduling Algorithm for Multiple Memory Controllers," IEEE 16th International Symposium on High Performance Computer Architecture (HPCA), pp. 1-12 (Jan. 9-14, 2010).

Liu, L., et al., "A Software Memory Partition Approach for Eliminating Bank-level Interference in Multicore Systems," Proceedings of the 21st international conference on Parallel architectures and compilation techniques, pp. 367-376 (Sep. 19-23, 2012).

Pesterev, A., et al., "Improving Network Connection Locality on Multicore Systems," Proceedings of the 7th ACM european conference on Computer Systems, pp. 337-350 (Apr. 10-13, 2012).

Sibai, F.N., "Performance Effect of Localized Thread Schedules in Heterogeneous Multi-Core Processors," 4th International Conference on Innovations in Information Technology, pp. 292-296 (Nov. 18-20, 2007).

\* cited by examiner

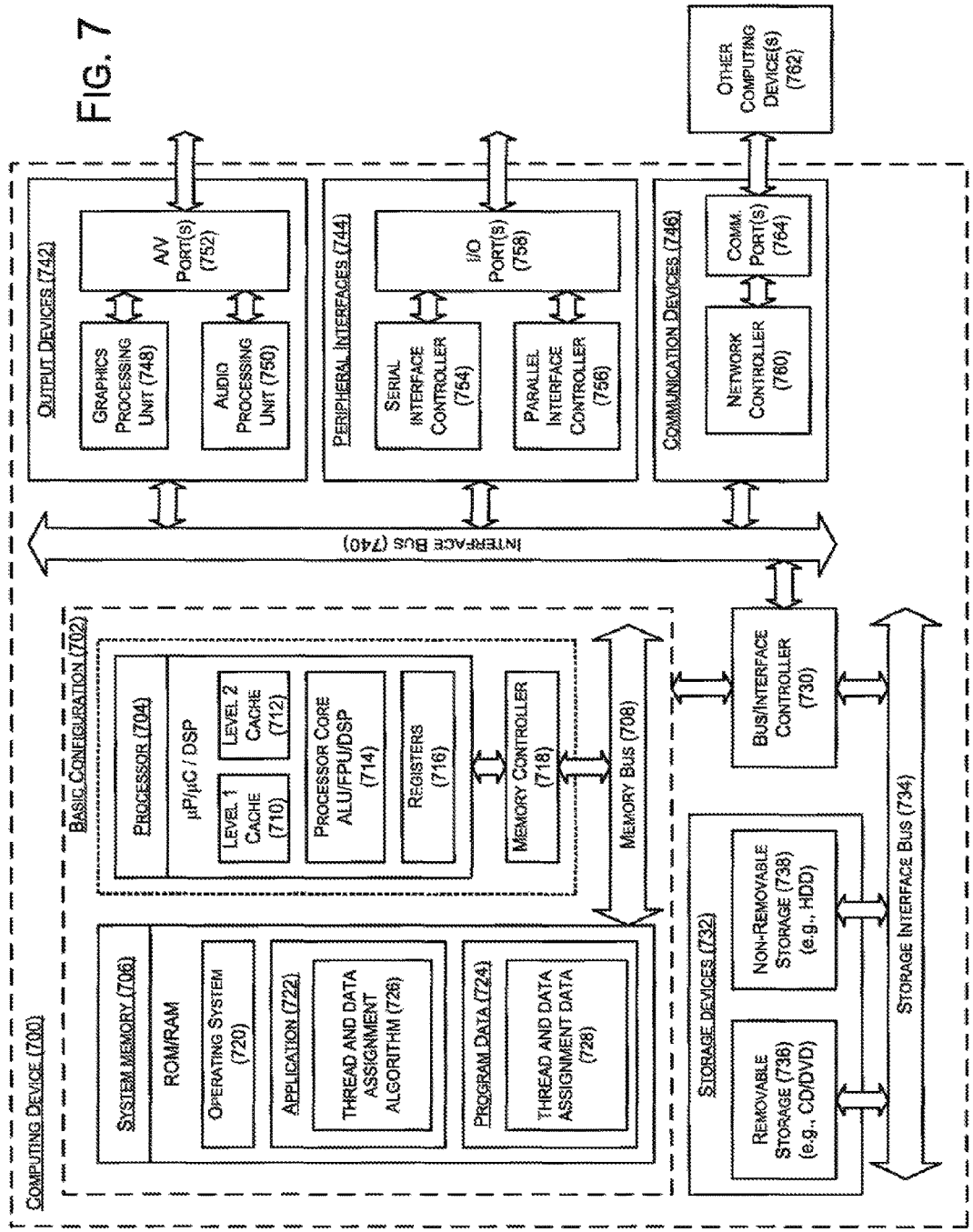

THREAD AND DATA ASSIGNMENT IN MULTI-CORE PROCESSORS BASED ON CACHE MISS DATA AND THREAD CATEGORY

CROSS-REFERENCE TO RELATED APPLICATIONS

The present application is a continuation application under 35 U.S.C. § 120 of U.S. application Ser. No. 14/758,404 filed on Jun. 29, 2015, which is a U.S. National Stage filing under 35 U.S.C. § 371 of International Application No. PCT/US2014/019052, filed on Feb. 27, 2014, entitled "THREAD AND DATA ASSIGNMENT IN MULTI-CORE PROCESSORS." International Application No. PCT/US2014/019052 and U.S. application Ser. No. 14/758,404, including any appendices or attachments thereof, are hereby incorporated by reference in their entirety.

BACKGROUND

Unless otherwise indicated herein, the materials described in this section are not prior art to the claims in this application and are not admitted to be prior art by inclusion in this section.

In multi-core processors, multiple processor cores may be included in a single integrated circuit die or on multiple integrated circuit dies that are arranged in a single chip package. Multi-core processors may have two or more processor cores interfaced for enhanced performance and efficient processing of multiple tasks and threads. Threads may be assigned to one or more processor cores in multi-core processors based on issues such as latency, cache utilization, and load balancing.

SUMMARY

In some examples, methods to process an instruction to assign a thread to a particular core in a multi-core processor are generally described. The multi-core processor may include a first core, a second core, a first memory controller, and a second memory controller. The methods may include determining first miss data that relates to a first number of times the first memory controller fetches from a memory in response to cache misses experienced by the first core. The methods may further include determining second miss data that relates to a second number of times the first memory controller fetches from the memory in response to cache misses experienced by the second core. The methods may include determining third miss data that relates to a third number of times the second memory controller fetches from the memory in response to cache misses experienced by the first core. The methods may further include determining fourth miss data that relates to a fourth number of times the second memory controller fetches from the memory in response to cache misses experienced by the second core. The methods may further include processing the instruction to assign the thread to the first core. The instruction to assign the thread may be based on the first, second, third, and fourth miss data.

In some examples, methods to generate an instruction to store data for a thread are generally described. The methods may include identifying a core assigned to execute the thread. The methods may further include selecting a memory controller based on a proximity between the memory controller and the core. The methods may further include identifying memory addresses assigned to the memory controller. The methods may further include coloring the memory addresses by addition of a label for the memory controller in a tag portion of a cache address of data for the thread. The methods may include generating the instruction to store data for the thread in the memory addresses assigned to the memory controller based on the label.

In some examples, multi-core processors effective to process an instruction to assign a thread to a particular core are generally described. The multi-core processors may include a first tile that includes a first core and a first cache controller. The multi-core processors may further include a second tile that includes a second core and a second cache controller. The second tile may be configured to be in communication with the first tile. The multi-core processors may further include a first memory controller configured to be in communication with the first tile and the second tile. The multi-core processors may include a second memory controller configured to be in communication with the first tile and the second tile. The first tile may be configured to determine first miss data that relates to a first number of times the first memory controller fetches from a memory in response to cache misses experienced by the first core. The first tile may be further configured to determine second miss data that relates to a second number of times the second memory controller fetches from the memory in response to cache misses experienced by the first core. The second tile may be configured to determine third miss data that relates to a third number of times the first memory controller fetches from the memory in response to cache misses experienced by the second core. The second tile may be further configured to determine fourth miss data that relates to a fourth number of times the second memory controller fetches from the memory in response to cache misses experienced by the second core. The multi-core processor may be configured to process the instruction to assign the thread to the first core. The instruction to assign the thread may be based on the first, second, third, and fourth miss data.

In some examples, systems effective to assign a thread to a particular core of a multi-core processor are generally described. The systems may include an operating system. The multi-core processor may be configured to be in communication with a memory and the operating system. The multi-core processor may include a first tile that includes a first core. The multi-core processor may further include a second tile that includes a second core. The second tile may be configured to be in communication with the first tile. The multi-core processor may further include a first memory controller configured to be in communication with the first tile, the second tile and the memory. The multi-core processor may further include a second memory controller configured to be in communication with the first tile, the second tile and the memory. The first tile may be configured to determine first miss data that relates to fetches by the first memory controller from the memory in response to cache misses experienced by the first core. The first tile may be further configured to determine second miss data that relates to fetches by the second memory controller from the memory in response to cache misses experienced by the first core. The second tile may be configured to determine third miss data that relates to fetches by the first memory controller from the memory in response to cache misses experienced by the second core. The second tile may be further configured to determine fourth miss data that relates to fetches by the second memory controller from the second memory in response to cache misses experienced by the second core. The operating system may be effective to receive the first, second, third and fourth miss data. The operating system may be further effective to assign the thread to the first core based on the first, second, third, and fourth miss data.

In some examples, methods to generate an instruction to assign a thread to a particular core in a multi-core processor are generally described. The multi-core processor may include a first core, a second core, a first memory controller, and a second memory controller. The methods may include analyzing first miss data that relates to a first number of times the first memory controller fetches from a memory in response to cache misses experienced by the first core. The methods may further include analyzing second miss data that relates to a second number of times the first memory controller fetches from the memory in response to cache misses experienced by the second core. The methods may include analyzing third miss data that relates to a first number of times the second memory controller fetches from the memory in response to cache misses experienced by the first core. The methods may include analyzing fourth miss data that relates to a fourth number of times the second memory controller fetches from the memory in response to cache misses experienced by the second core. The methods may further include generating the instruction to assign the thread to the first core. The instruction to assign the thread may be based on the analyzed first, second, third, and fourth miss data.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 7 is a block diagram illustrating an example computer device that is arranged to implement thread and data assignment in multi-core processors, all arranged according to at least some embodiments described herein.

DETAILED DESCRIPTION

Figure 1:
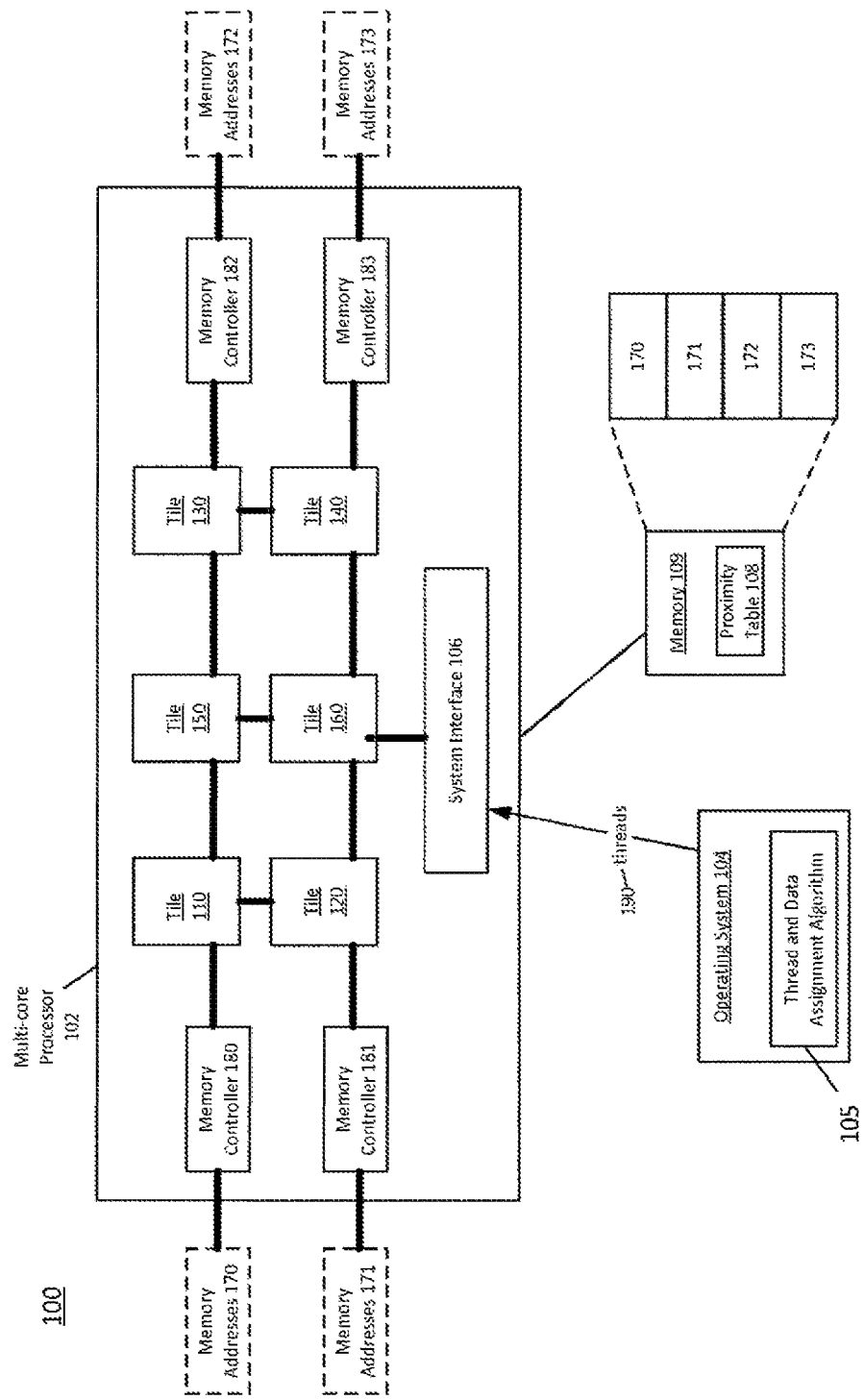
FIG. 1 illustrates an example system that can be utilized to implement thread and data assignment in multi-core processors.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to thread and data assignment in multi-core processors.

Briefly stated, technologies are generally described for methods and systems to assign threads in a multi-core processor. In an example, a method to assign threads in a multi-core processor may include determining data relating to memory controllers fetching data in response to cache misses experienced by a first core and a second core. Threads may be assigned to cores based on the number of cache misses processed by respective memory controllers. Methods may further include determining that a thread is latency-bound or bandwidth-bound. Threads may be assigned to cores based on the determination of the thread as latency-bound or bandwidth-bound.

FIG. 1 illustrates an example system that can be utilized to implement thread and data assignment in multi-core processors arranged in accordance with at least some embodiments described herein. An example system 100 may include a multi-core processor 102 and/or a memory 109. Multi-core processor 102 may include a system interface 106, a plurality of tiles 110, 120, 130, 140, 150, 160 and/or a plurality of memory controllers 180, 181, 182, 183 configured to be in communication with each other. Each tile may include one or more cores configured to execute threads (discussed below). System interface 106 may be configured in communication with an operating system 104 and/or at least one tile in multi-core processor 102, such as tile 160. Operating system 104 and/or other component may be configured to assign one or more threads 190 to one or more cores in multi-core processor 102.

Multi-core processor 102 may be configured to access data stored in memory 109, such as by memory controllers 180, 181, 182, 183. Memory controllers 180, 181, 182, 183 may be configured in communication with memory 109 and/or be respectively configured in communication with tiles 110, 120, 130, 140. Memory 109 may be partitioned, such as by operating system 104, into one or more ranges of memory addresses 170, 171, 172, 173. Memory controllers 180, 181, 182, 183 may be associated to particular memory addresses 170, 171, 172, 173 in memory 109. Memory 109 may include a proximity table 108. Proximity table 108 may include data relating to locations of tiles 110, 120, 130, 140, 150, 160 and/or memory controllers 180, 181, 182, 183 in multi-core processor 102. In some examples, operating system 104 may be configured to analyze data in proximity table 108. In some examples, one or more components, such as cores in multi-core processor 102 may be configured to analyze data in proximity table 108.

As discussed in more detail below, operating system 104 may, in accordance with a thread and data assignment algorithm 105, assign threads 190 to one or more cores in multi-core processor 102. Operating system 104 may also, in accordance with thread and data assignment algorithm 105, assign data to locations in memory 109. In some examples, one or more components, such as cores in multi-core processor 102 may assign threads 190 to one or more cores in multi-core processor 102 or may assign data to locations in memory 109. Assignment of threads 190 and data may be based on a usage of memory controllers.

Figure 2:
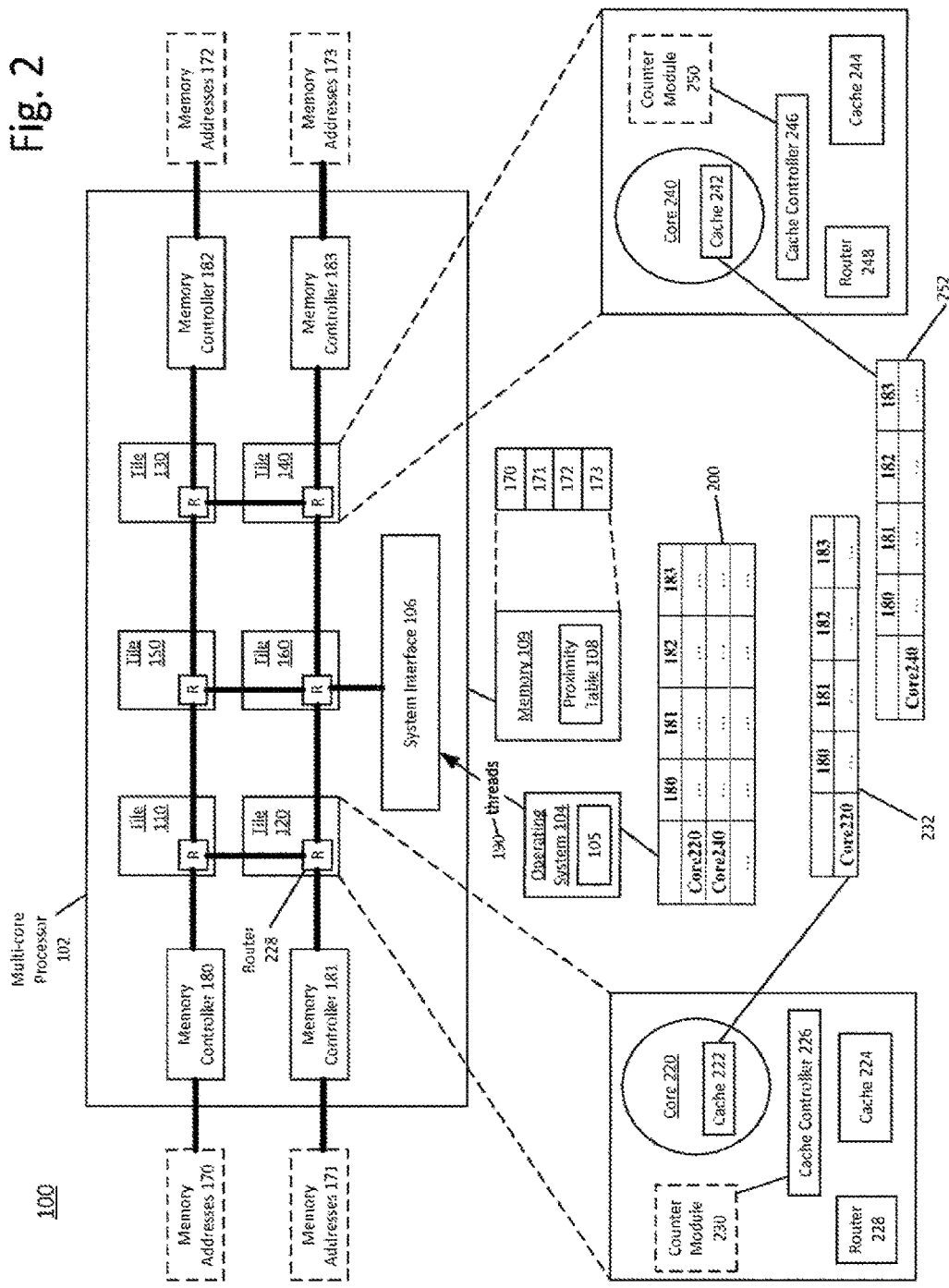
FIG. 2 illustrates further details of the example system of FIG. 1.

FIG. 2 illustrates further details of the example system of FIG. 1, arranged in accordance with at least some embodiments described herein. FIG. 2 includes elements in system 100 of FIG. 1, with additional details. Those components in FIG. 2 that are labeled identically to components of FIG. 1 will not be described again for the purposes of clarity and brevity.

Tiles 110, 120, 130, 140, 150, 160 may include substantially the same elements. Focusing on tile 120 as illustrative of other tiles, tile 120 may include a processor core ("core") 220, a cache 224, a cache controller 226 and/or a router 228. Cache controller 226 or router 228 may include a coherence directory responsible for certain range of memory addresses in the system. Core 220 may include a cache 222 such as an L1 cache. Cache 224 may be an L2 cache. Router 228 may be configured to route threads and/or data to one or more neighboring routers, such as a router in tile 110 and/or tile 160. Cache controller 226 may include a counter module 230. Counter module 230 may include one or more hardware components, such as counters. In another example, counter module 230 may be inside tile 120 and outside of cache controller 226. Cache controller 226 may be configured in communication with cache 222, cache 224, router 228 and/or counter module 230. Cache controller 226 may generate a data source table 232 and store data source table 232 in cache 222 or cache 224. In some examples, data source table 232 may be stored in a dedicated hardware structure. Data source table 232 may include data reflecting values of counters in counter module 230. Cache controller 226 may assign counters in counter module 230 to a respective memory controller in multi-core processor 102. Counters in counter module 230 may be configured to count a number of times the respective memory controller fetches data from memory 109 in response to cache misses experienced core 220.

Similarly, tile 140 may include a core 240, a cache 244, a cache controller 246 and/or a router 248. Core 240 may include a cache 242 such as a L1 cache. Cache 244 may be a L2 cache. Router 248 may be configured to route threads and/or data to one or more neighboring routers, such as a router in tile 130 and/or tile 160. Cache controller 246 may include a counter module 250. Counter module 250 may include one or more hardware components, such as counters. In another example, counter module 250 may be inside tile 140 and outside of cache controller 246. Cache controller 246 may be configured in communication with cache 242, cache 244, router 248 and/or counter module 250. Cache controller 246 may generate a data source table 252 and store data source table 252 in cache 242 or cache 244. In some examples, data source table 252 may be stored in a dedicated hardware table. Data source table 252 may include data reflecting values of counters in counter module 250. Cache controller 246 may assign counters in counter module 250 to a respective memory controller in multi-core processor 102. Counters in counter module 250 may be configured to count a number of times the respective memory controller fetches data from memory 109 in response to cache misses experienced by core 240.

Operating system 104 may assign threads 190 to be executed in one or more cores in multi-core processor 102 through system interface 106. In one example, operating system 104 may assign threads 190 to be executed in one or more cores in response to a determination that the thread is latency-bound and may benefit from a latency-sensitive protocol. A latency-bound thread may include requirements to minimize (or reduce) data access time for a particular thread, minimize (or reduce) cost of data access, minimize (or reduce) a transmission distance between the core executing the thread and a memory controller, etc. In another example, operating system 104 may assign threads 190 to be executed in one or more cores in response to a determination that the thread is bandwidth-bound. A bandwidth-bound thread may include requirements to maximize (or improve) data access rate (bandwidth) to multiple memory controllers. In some examples, some threads may not be bandwidth-bound but may benefit from a bandwidth-sensitive protocol. An example of threads that may not necessarily be bandwidth-bound but may benefit from a bandwidth-sensitive protocol are threads from a parallel application that utilize multiple memory controllers, etc. These threads include requirements to run at approximately the same speed, hence they may benefit from running in cores that are equally near or far from multiple memory controllers.

Operating system 104 may compile data from one or more data source tables of tiles in multi-core processor 102, such as by communication with system interface 106, and may generate a miss data table 200 in response. Operating system 104 may analyze data in miss data table 200 and assign threads 190 to one or more assigned cores in multi-core processor 102. Operating system 104 may further assign data to be stored in an assigned range of memory addresses in memory 109 based on the assigned core. In some examples, one or more components in multi-core processor 102 may compile data to generate miss data table 200 and/or analyze data in miss data table 200.

Figure 3:
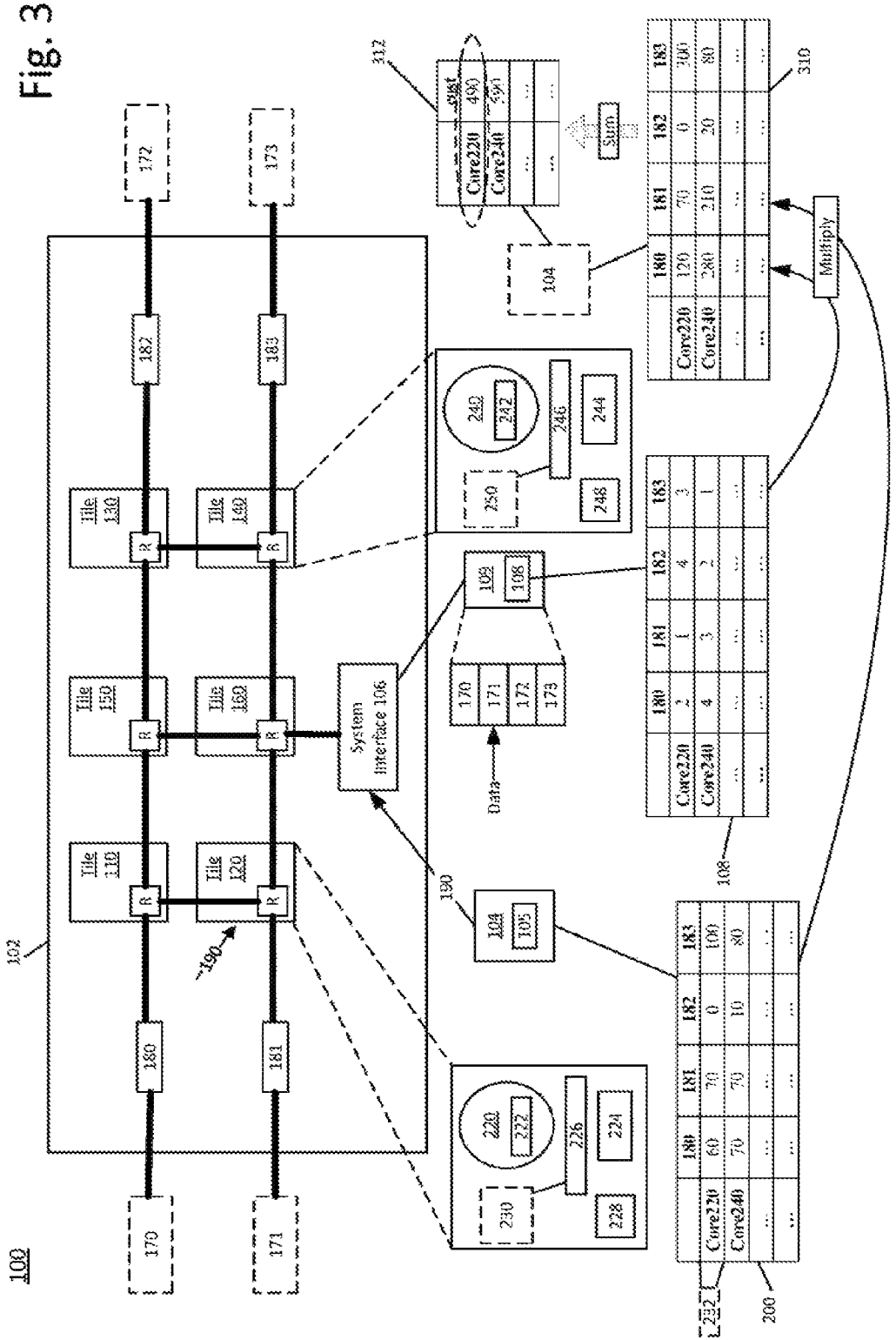
FIG. 3 illustrates the example system of FIG. 1 relating to an implementation of thread and data assignment in multi-core processors.

FIG. 3 illustrates the example system of FIG. 1 relating to an implementation of thread and data assignment in multi-core processors, arranged in accordance with at least some embodiments described herein. FIG. 3 includes elements in system 100 of FIG. 2, with additional details. Those components in FIG. 3 that are labeled identically to components of FIG. 2 will not be described again for the purposes of clarity and brevity.

Counters in counter module 230 may be configured to count a number of times a respective memory controller fetches data from memory 109 in response to cache misses experienced by core 220 within a time period, such as between multiple microseconds to multiple milliseconds. For example, a first counter in counter module 230 may be assigned to memory controller 180. The first counter may be configured to count a number of times memory controller 180 fetches data from memory 109 in response to cache miss experienced by core 220 within the time period. In the example, data source table 232 shows that memory controller 180 fetched data from memory 109 in response to cache misses experienced by core 220 a total of "60" times within the time period. A second counter in counter module 230 may be assigned to memory controller 181. The second counter may be configured to count a number of times memory controller 181 fetches data from memory 109 in response to cache misses experienced by core 220 within the time period. In the example, data source table 232 shows that memory controller 181 fetched data from memory 109 in response to cache misses experienced by core 220 a total of "70" times within the time period. Similarly, each counter in counter module 250 may be configured to count a number of times the respective memory controller fetches data from memory 109 in response to cache misses experienced by core 240 within a time period.

Proximity table 108 may include data corresponding to locations of tiles and memory controllers in multi-core processor 102. As shown in FIG. 3, proximity table 108 shows how many "hops" may be between cores and memory controllers in multi-core processor 102. The number of hops may represent the number of routers in a valid routing path that a core may go through to send a request to a memory controller. The number of hops may also represent the number of routers in a combination of valid coherence protocol and routing path that a core may go through to send a request to a memory controller, for example the number of hops may be the sum of the number of hops from a core to a directory, and the number of hops from the directory on to a memory controller. As an example for the case where the number of hops represents the number of routers in a valid path between a core and a memory controller, consider a data request made by thread 190 from core 220, sent to memory controller 180. Core 220 may first forward thread 190 to tile 110, then tile 110 may forward thread 190 to memory controller 180, resulting in 2 hops (two instances of forwarding). The number of hops in proximity table 108 may be based on a valid shortest possible path. In the example, memory controller 180 is 2 hops away from core 220. Memory controller 181 is 1 hop away from core 220. Memory controller 182 is 4 hops away from core 220. Memory controller 183 is 3 hops away from core 220 based on a valid shortest possible path.

Operating system 104 may assign threads 190 to be executed in one or more cores in multi-core processor 102 based on a category. The category may include "neither", "latency-bound", or "bandwidth-bound". A category of "latency-bound" may require operating system 104 to assign threads 190 using a latency-sensitive protocol. A category of "bandwidth-bound" may require operating system 104 to assign threads 190 using a bandwidth-sensitive protocol. When threads 190 are determined as category "neither", operating system 104 may assign threads 190 to one or more cores in multi-core processor 102 without a requirement to operate under a specific protocol.

Operating system 104, or one or more components in multi-core processor 102, may be configured to determine a category of threads 190. Determination of category of threads 190 may be based on a first threshold value and a second threshold value. The first threshold value and the second threshold value may be based on cache misses per second. The first threshold value may be less than the second threshold value. For example, the first threshold value may be 10,000 cache misses per second while the second threshold value may be 100,000 cache misses per second. Threads may be determined as category "neither" if the number of cache misses per second is less than the first threshold value. Threads may be determined as category "latency-bound" if the number of cache misses per second is greater than the first threshold value and less than the second threshold value. Threads may be determined as category "bandwidth-bound" if the number of cache misses per second is greater than the second threshold value.

FIG. 3 illustrates an example where threads 190 are determined as category latency-bound by operating system 104. Under a latency-sensitive protocol, operating system 104 may assign threads 190 to a core based on a cost, where the cost may be based on data in miss data table 200 and/or proximity table 108. In an example, cores in multi-core processor 102 or operating system 104 may determine a cost relating to an amount of time for a respective memory controller to fetch data from memory 109. In another example, cores or the operating system 104 may determine a cost between cores and memory controllers in multi-core processor 102.

In some examples, proximity table 108 may be stored in a special hardware structure or cache of tiles in multi-core processor 102. Cores in multi-core processor 102 may be configured to perform one or more operations on data in a respective data source table (such as data source table 252) and proximity table 108. Cores in multi-core processor 102 may be further configured to generate data to populate a data cost table 310 and to populate a schedule cost table 312. Costs may reflect a cost to communicate between a core and a memory controller. Operating system 104, or one or more components in multi-core processor 102, may compile data generated by cores in multi-core processor 102 to generate data cost table 310 and schedule cost table 312. Data cost table 310 may include data corresponding to combinations of data in miss data table 200 and proximity table 108. Schedule cost table 312 may include data corresponding to combinations of particular groups of data in data cost table 310. In some examples, a cost may be based on latency or power consumption. Cache controllers in tiles may store latency times reflecting transmission of threads and/or data between a respective core and memory controller, either directly or through a coherence directory. For example, cache controller 226 in tile 120 may store latency times during transmission of thread and/or data between core 220 and memory controllers 180, 181, 182, 183 in cache 222 and/or cache 224. Core 220 may populate schedule cost table 312 based on recent latency times stored in cache 222 and/or cache 224.

In an example, core 220 may determine a first combination, such as by multiplication, of data in data source table 232 and data corresponding to core 220 in proximity table 108. Core 220 may send the multiplied data to operating system 104. Operating system 104 may receive the multiplied data from core 220 and populate and/or update data cost table 310. In the example, focusing on data corresponding to core 220 and memory controller 180 in miss data table 200 and proximity table 108, operating system 104 may multiply data "60" with "2" to generate a result "120" in data cost table 310. Focusing on data corresponding to core 220 and memory controller 181 in miss data table 200 and proximity table 108, operating system 104 may multiply data "70" with "1" to generate a result "70" in data cost table 310. Operating system 104 or a hardware controller may further sum multiplied data corresponding to core 220 and memory controllers 180, 181, 182, 183 to generate data for schedule cost table 312. For example, for core 220 in data cost table 310, 120+70+0+300=490, and so operating system 104 may populate "490" into schedule cost table 312 with respect to core 220.

Operating system 104, or one or more components in multi-core processor 102, may analyze data in schedule cost table 312 and identify a core which includes a minimum or otherwise improved schedule cost. As shown in the example of FIG. 3, core 220 may be the core with minimum or otherwise lower schedule cost relative to other cores in multi-core processor 102. Operating system 104, or one or more components in multi-core processor 102, may identify core 220 and assign threads 190 to core 220.

In response to operating system 104 identifying core 220, core 220 or operating system 104 may analyze data in proximity table 108 and determine that memory controller 181 is closest in proximity to core 220. Core 220 or operating system 104 may identify memory addresses 171 assigned to memory controller 181. Operating system 104 may store data in memory 109 and respective caches based on the assigned core. In an example, operating system 104 may virtually assign indicators such as colors to different page frames based on some bits in the tag portion of cache addresses of data relating to threads 190, such that page frames that are associated with a memory controller have a single color. For example, multi-core processor 102 may include four memory controllers 180, 181, 182, 183. Operating system 104 may color page frames based on 2 bits in a tag portion of memory addresses of data relating to threads 190. Operating system 104 may assign different colors to "00", "01", "10", or "11" to respectively represent memory addresses 170, 171, 172, 173. Operating system 104 may migrate a page of data from an old page frame with a first color to another page frame with a second color. Through that process, operating system 104 changes the address of data from one memory controller to a new memory controller. When operating system 104 wants to assign data to memory addresses 171, operating system 104 may migrate a page of data relating to threads 190 from a page frame with address bits "00", "10", or "11" to a page frame with address bits "01". Operating system 104 may continue to migrate data relating to threads 190 to memory addresses 171 until each cache controller in each tile of multi-core processor 102 resets a respective counter module.

Figure 4:
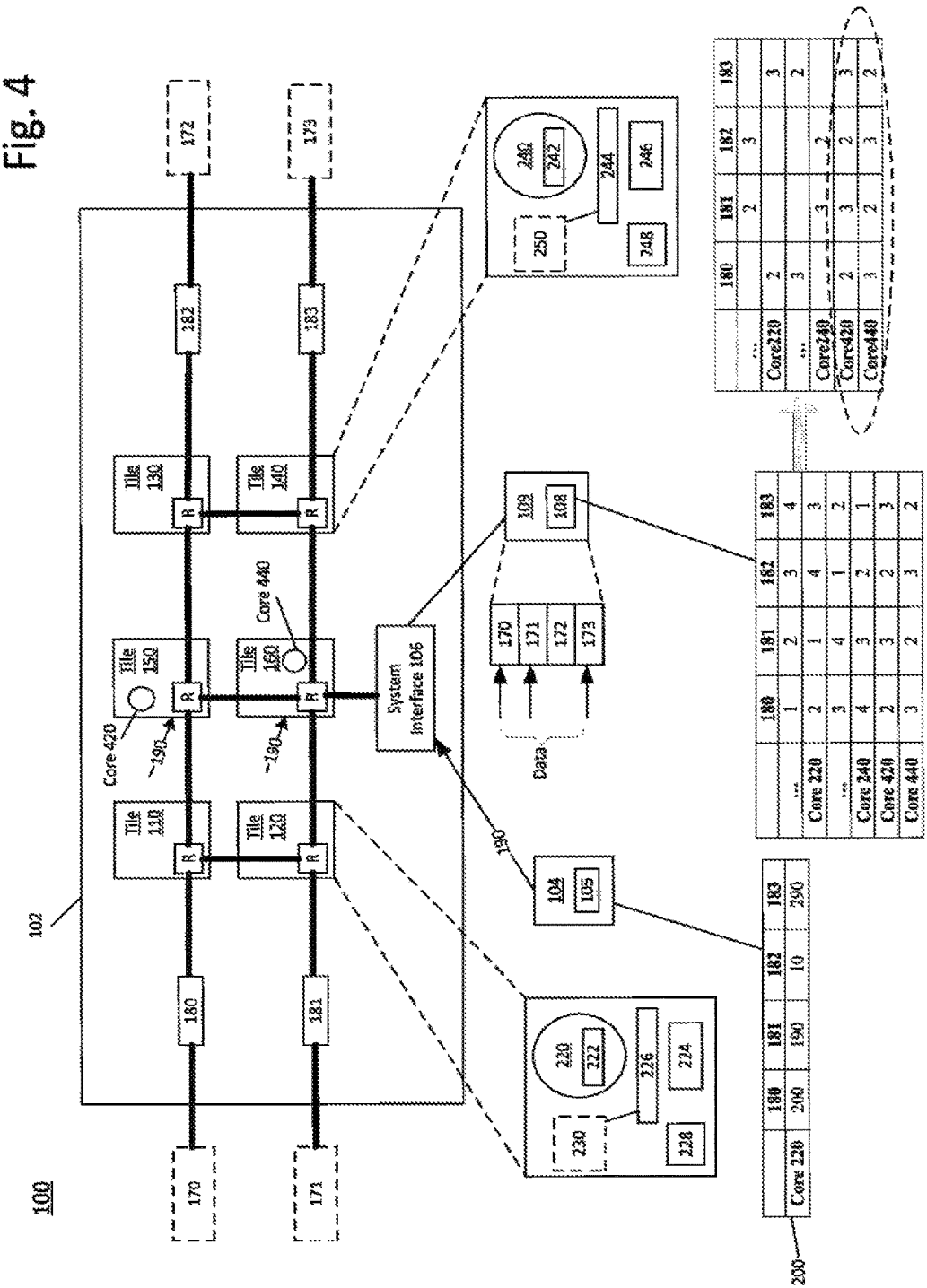
FIG. 4 illustrates the example system of FIG. 1 relating to another implementation of thread and data assignment in multi-core processors.

FIG. 4 illustrates the example system of FIG. 1 relating to another implementation of thread and data assignment in multi-core processors, arranged in accordance with at least some embodiments described herein. FIG. 4 includes elements in system 100 of FIG. 2, with additional details. Those components in FIG. 4 that are labeled identically to components of FIG. 2 will not be described again for the purposes of clarity and brevity.

FIG. 4 illustrates an example where thread 190 is identified as category bandwidth bound by operating system 104 and so a bandwidth-sensitive protocol may be used, alternatively or additionally to a latency-sensitive protocol. Under a bandwidth-sensitive protocol, operating system 104 may assign threads 190 to one or more cores based on the number of hops between cores and memory controllers in multi-core processor 102, using data in proximity table 108. Cores with the same or substantially the same distance to two or more memory controllers may be selected. In the example shown, tiles and memory controllers in multi-core processor 102 may be separated by a minimum distance of 1 hop and a maximum distance of 4 hops. Operating system 104 may analyze data in proximity table 108. Operating system 104 may be configured to identify cores at distances of 1 hop and 4 hops as "unbalanced" because the distances in hops are relatively far apart, and identify cores at distances of 2 hops and 3 hops as "balanced". Operating system 104 may further be configured to identify two or more cores that include the most "balanced" distance away from memory controllers in multi-core processor 102. Threads of a parallel program may be assigned to cores using a bandwidth-sensitive protocol as well in order to keep the speed of threads relatively balanced.

For example, operating system 104 may analyze proximity table 108 through system interface 106. Operating system 104 may identify cores that include the greatest or relatively larger number of 2 hops and 3 hops to memory controllers in proximity table 108. In the example shown, core 420 and core 440 include the greatest number of 2 hops and 3 hops to memory controllers in proximity table 108. Operating system 104 may identify cores 420, 440 and assign threads 190 to cores 420, 440. In another example, under a bandwidth sensitive protocol, operating system 104 may identify one or more cores that are located near a center point between all memory controllers in multi-core processor 102.

When threads 190 are identified as category "neither", operating system 104 may assign threads 190 to one or more cores in multi-core processor 102 without a requirement to operate under a specific protocol. For example, when threads 190 are identified as category "neither", operating system 104 may assign threads 190 to one or more cores that handled most of the threads within threads 190 previously. In another example, operating system 104 may execute a load balancing algorithm to assign threads 190 to cores in multi-core processor 102 equally. In another example, operating system 104 may assign threads 190 to one or more cores in multi-core processor based on cores' availability, operating speed, compatibility with threads 190, etc.

Among other possible features, a system in accordance with the disclosure may decrease latency that may otherwise be generated when data is accessed from a memory. A system may be able to present a synergistic relationship between thread assignment and data assignment in a multi-core processor. For example, a first memory controller and a second memory controller configured in communication with a core may each fetch data from a memory in response to cache misses experienced by the core. The first memory controller may fetch more data compared to the second memory controller. When an operating system assigns threads to the core, data relating to the threads may be stored primarily in a set of memory addresses assigned to the first memory controller. During execution of the threads on the core, the first memory controller may fetch data relating to the threads more often than the second memory controller due to the location of data being in the set of memory addresses. The assignment of data to the set of memory addresses may improve execution time of the threads and may reduce latency due to the close proximity between the core and the first memory controller. Also, in response to assigning data relating to the threads to the set of memory addresses, the operating system may schedule future threads to the core to maintain the synergistic relationship.

Figure 5:
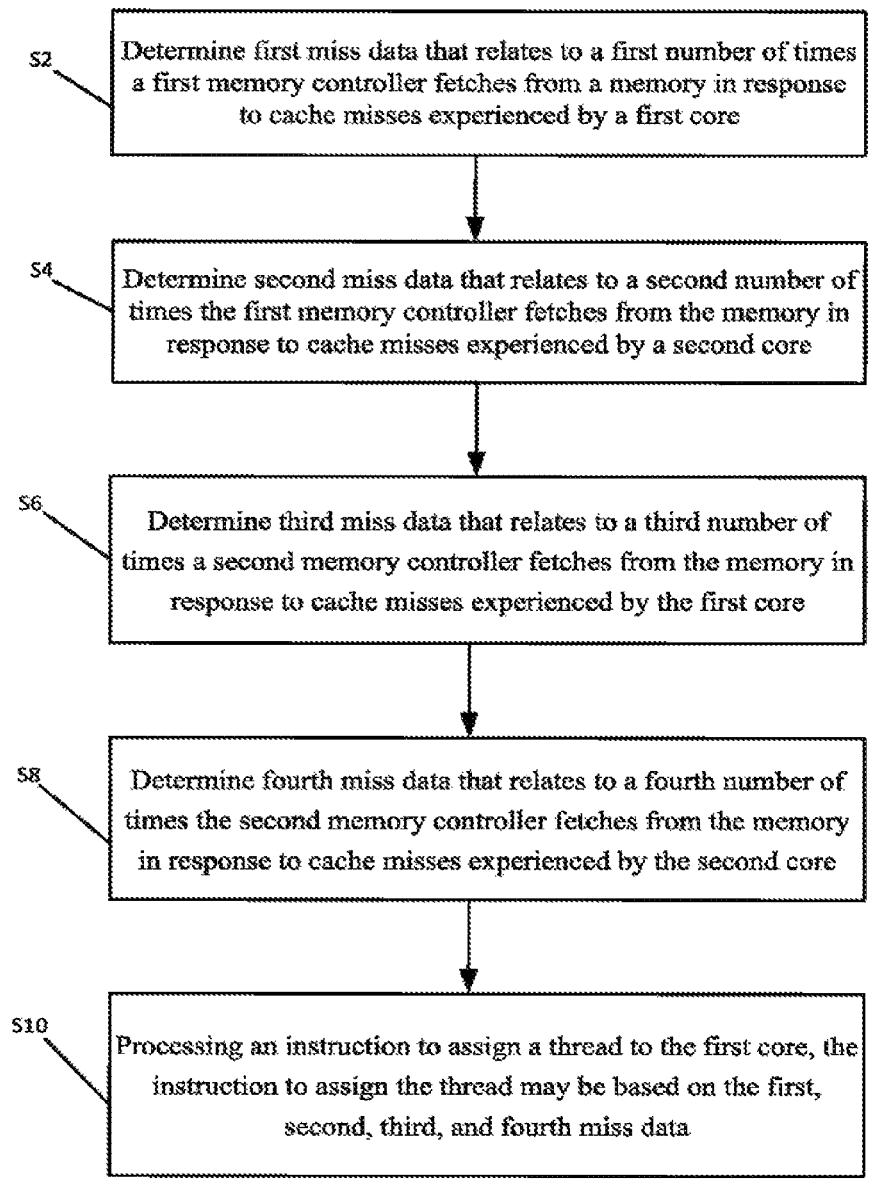
FIG. 5 depicts a flow diagram for an example process to implement thread and data assignment in multi-core processors.

FIG. 5 depicts a flow diagram for an example process to implement thread and data assignment in multi-core processors arranged in accordance with at least some embodiments described herein. In some examples, the process in FIG. 5 could be implemented using system 100 discussed above to assign threads and data in a multi-core processor.

An example process may include one or more operations, actions, or functions as illustrated by one or more blocks S2, S4, S6, S8, and S10. Although illustrated as discrete blocks, various blocks may be divided into additional blocks, combined into fewer blocks, supplemented with additional blocks representing other operations, actions, or functions, or eliminated, depending on the particular implementations. The operations in the blocks may be performed by, for example, an operating system or multi-core processor.

Processing may begin at block S2, "Determine first miss data that relates to a first number of times a first memory controller fetches from a memory in response to cache misses experienced by a first core." At block S2, an operating system or multi-core processor may determine a first miss data. The first miss data may be related to a first number of times in a first time period a first memory controller in the multi-core processor fetches data from a memory in response to cache misses experienced by a first core of the multi-core processor.

Processing may continue from block S2 to S4, "Determine second miss data that relates to a second number of times the first memory controller fetches from the memory in response to cache misses experienced by a second core." At block S4, the operating system or multi-core processor may determine a second miss data. The second miss data may be related to a second number of times the first memory controller in the multi-core processor fetches data from the memory in response to a cache miss experienced by a second core of the multi-core processor.

Processing may continue from block S4 to S6, "Determine third miss data that relates to a third number of times a second memory controller fetches from the memory in response to cache misses experienced by the first core." At block S6, the operating system or multi-core processor may determine a third miss data. The third miss data may be related to a third number of times a second memory controller in the multi-core processor fetches data from the memory in response to a cache miss experienced by the first core of the multi-core processor.

Processing may continue from block S6 to S8, "Determine fourth miss data that relates to a fourth number of times the second memory controller fetches from the memory in response to cache misses experienced by the second core." At block S8, the operating system or multi-core processor may determine a fourth miss data. The fourth miss data may be related to a fourth number of times the second memory controller in the multi-core processor fetches data from the memory in response to a cache miss experienced by the second core of the multi-core processor.

Processing may continue from block S8 to S10, "Processing an instruction to assign a thread to the first core. The instruction to assign the thread may be based on the first, second, third, and fourth miss data." At block S10, the operating system or multi-core processor may process an instruction to assign a thread to the first core. The instruction to assign the thread may be based on the first, second, third, and fourth miss data.

The operating system or multi-core processor may further determine costs to communicate between the cores and memory controllers. The instruction to assign the thread may be further based on the costs. The costs may be based on a number of hops.

The operating system or multi-core processor may further select the first memory controller based on a proximity between the first memory controller and the first core. The operating system or multi-core processor may further identify memory addresses assigned to the selected first memory controller. The operating system or multi-core processor may further process an instruction to migrate pages of data for the thread in the memory addresses assigned to the selected first memory controller. The operating system or multi-core processor may further identify a color of the memory addresses. The color may be a label for the first memory controller in a tag portion of a cache address of data for the thread.

The multi-core processor may further determine at least two memory controllers at an equal distance from the first core. The operating system or multi-core processor may further identify memory addresses assigned to the at least two memory controllers. The operating system or multi-core processor may further process an instruction to store data for the thread in the memory addresses assigned to the at least two memory controllers.

Figure 6:
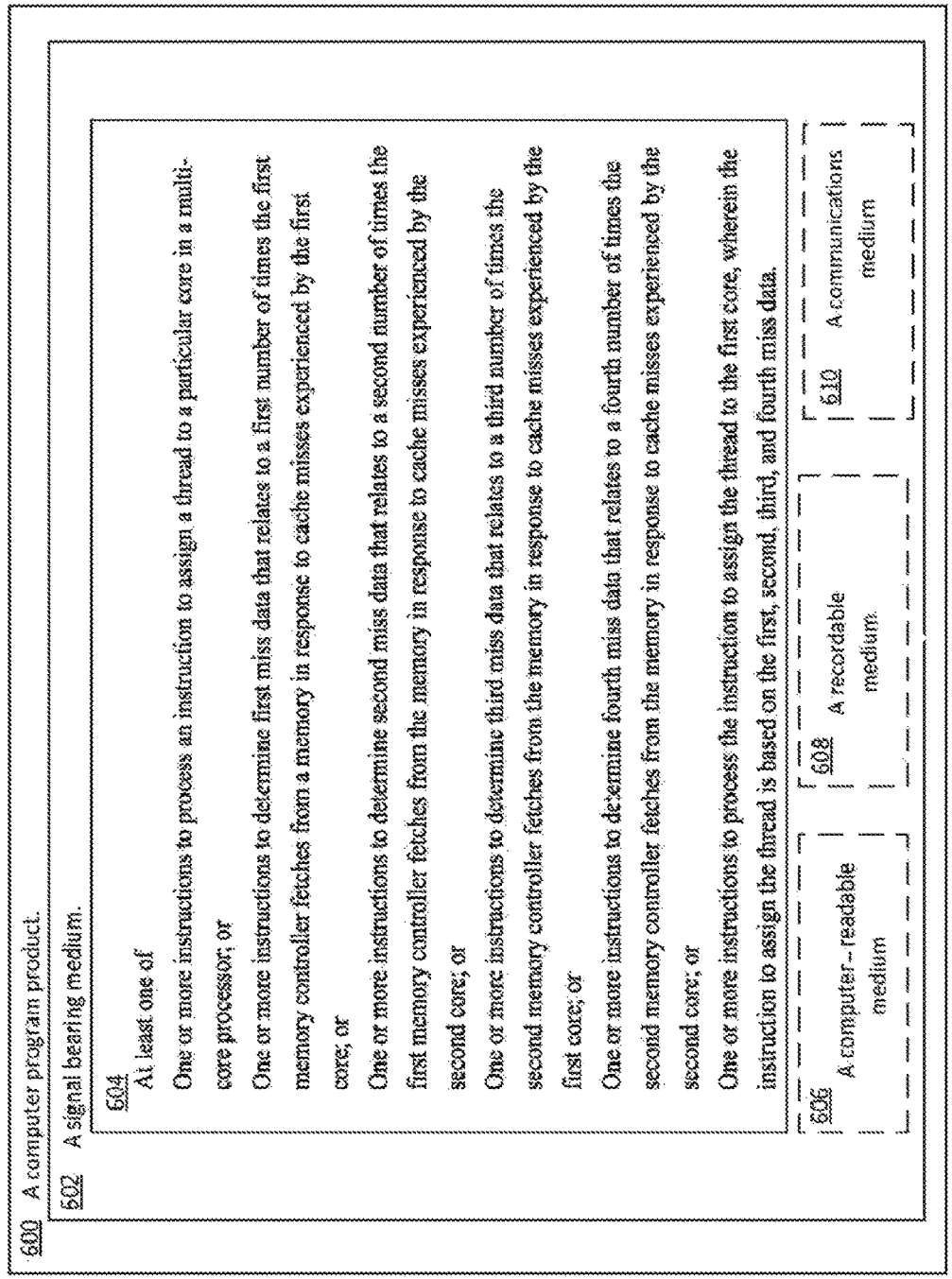
FIG. 6 illustrates a computer program product that can be utilized to implement thread and data assignment in multi-core processors.

FIG. 6 illustrates a computer program product that can be utilized to implement thread and data assignment in multi-core processors arranged in accordance with at least some embodiments described herein. Computer program product 600 may include a signal bearing medium 602. Signal bearing medium 602 may include one or more instructions 604 that, in response to execution by, for example, a processor, may provide the functionality and features described above with respect to FIGS. 1-5. Thus, for example, referring to system 100, multi-core processor 102 may undertake one or more of the blocks shown in FIG. 6 in response to instructions 604 conveyed to the system 100 by signal bearing medium 602.

In some implementations, signal bearing medium 602 may encompass a computer-readable medium 606, such as, but not limited to, a hard disk drive, a Compact Disc (CD), a Digital Video Disk (DVD), a digital tape, memory, etc. In some implementations, signal bearing medium 602 may encompass a recordable medium 608, such as, but not limited to, memory, read/write (R/W) CDs, R/W DVDs, etc. In some implementations, signal bearing medium 602 may encompass a communications medium 610, such as, but not limited to, a digital and/or an analog communication medium (e.g., a fiber optic cable, a waveguide, a wired communications link, a wireless communication link, etc.). Thus, for example, computer program product 100 may be conveyed to one or more modules of the system 100 by an RF signal bearing medium 602, where the signal bearing medium 602 is conveyed by a wireless communications medium 610 (e.g., a wireless communications medium conforming with the IEEE 802.11 standard).

FIG. 7 is a block diagram illustrating an example computer device that is arranged to implement thread and data assignment in multi-core processors arranged in accordance with at least some embodiments described herein. In a very basic configuration 702, computing device 700 typically includes one or more processors 704 (such as multi-core processor 102) and a system memory 706 (such as memory 109). A memory bus 708 may be used for communicating between processor 704 and system memory 706.

Depending on the desired configuration, processor 704 may be of any type including but not limited to a microprocessor (µP), a microcontroller (µC), a digital signal processor (DSP), or any combination thereof. Processor 704 may include one more levels of caching, such as a level one cache 710 and a level two cache 712, a processor core 714 (such as any one or more of cores 220 etc. described above), and registers 716. An example processor core 714 may include an arithmetic logic unit (ALU), a floating point unit (FPU), a digital signal processing core (DSP Core), or any combination thereof. An example memory controller 718 (such as memory controller 180 etc. above) may also be used with processor 704, or in some implementations memory controller 718 may be an internal part of processor 704.

Depending on the desired configuration, system memory 706 may be of any type including but not limited to volatile memory (such as RAM), non-volatile memory (such as ROM, flash memory, etc.) or any combination thereof. System memory 706 may include an operating system 720, one or more applications 722, and program data 724. Application 722 may include a thread and data assignment algorithm 726 that is arranged to perform the functions and operations as described herein including those described with respect to system 100 of FIGS. 1-6. Program data 724 may include a thread and data assignment data 728 (such as the counter data and the data populated in the various tables 108, 200, 232, 252, 310, 312 described above) that may be useful to implement thread and data assignment in multi-core processors (such as multi-core processor 102) as is described herein. In some embodiments, application 722 may be arranged to operate with program data 724 on operating system 720 (such as operating system 104) such that thread and data assignment may be provided. This described basic configuration 702 is illustrated in FIG. 7 by those components within the inner dashed line.

Computing device 700 may have additional features or functionality, and additional interfaces to facilitate communications between basic configuration 702 and any required devices and interfaces. For example, a bus/interface controller 730 may be used to facilitate communications between basic configuration 702 and one or more data storage devices 732 via a storage interface bus 734. Data storage devices 732 may be removable storage devices 736, non-removable storage devices 738, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and non-volatile, removable and non-removable media implemented in any method or technology for storage of information, such as computer readable instructions, data structures, program modules, or other data.

System memory 706, removable storage devices 736 and non-removable storage devices 738 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

Computing device 700 may also include an interface bus 740 for facilitating communication from various interface devices (e.g., output devices 742, peripheral interfaces 744, and communication devices 746) to basic configuration 702 via bus/interface controller 730. Example output devices 742 include a graphics processing unit 748 and an audio processing unit 750, which may be configured to communicate to various external devices such as a display or speakers via one or more A/V ports 752. Example peripheral interfaces 744 include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 746 includes a network controller 760, which may be arranged to facilitate communications with one or more other computing devices 762 over a network communication link via one or more communication ports 764.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. A method to assign a thread, the method comprising:
   determining a cache miss rate of a particular core in a multi-core processor, wherein the cache miss rate represents a number of times, within a time period, that a particular memory controller fetches data from a memory in response to the data being absent in a cache associated with the particular core in a particular tile of the multi-core processor;
   comparing the cache miss rate of the particular core with a first threshold value and a second threshold value, wherein the first threshold value is lower than the second threshold value;
   determining a category of the thread based on the comparison, wherein the determining comprises determining that the category of the thread is latency-bound, responsive to a determination that the cache miss rate is greater than the first threshold value and less than the second threshold value; and
   assigning the thread to the particular core using a latency-sensitive protocol based on cost that is based on at least one of the cache miss rate and a proximity table, responsive to the determination that the category of the thread is latency-bound.

2. The method of claim 1, wherein determining the category of the thread based on the comparison further comprises determining that the category of the thread is bandwidth-bound, responsive to a determination that the cache miss rate is greater than the second threshold value, the method further comprising assigning the thread to the particular core using a bandwidth-sensitive protocol based at least in part on a number of hops between the particular core and the particular memory controller, responsive to the determination that the category of the thread is bandwidth-bound.

3. The method of claim 2, wherein determining the category of the thread based on the comparison further comprises determining that the category of the thread is neither latency-bound nor bandwidth-bound, responsive to a determination that the cache miss rate is less than the first threshold value, the method further comprising assigning the thread to the particular core using one of the latency-sensitive protocol or the bandwidth-sensitive protocol.

4. The method of claim 1, further comprising:
   selecting a first core or a second core, included in the multi-core processor, as the particular core; and
   selecting a first memory controller or a second memory controller as the particular memory controller, wherein the selection of the first core and the second core as the particular core, and the selection of the first memory controller or the second memory controller as the particular memory controller, are based on a first cost, a second cost, a third cost, and a fourth cost, and wherein:
   the first cost includes a cost to communicate between the first core and the first memory controller,
   the second cost includes a cost to communicate between the first core and the second memory controller,
   the third cost includes a cost to communicate between the second core and the first memory controller, and
   the fourth cost includes a cost to communicate between the second core and the second memory controller.

5. The method of claim 4, wherein the first, second, third, and fourth costs are based on a number of hops between a respective core and a respective memory controller.

6. The method of claim 5, wherein the number of hops includes a number of routers.

7. A system configured to assign a thread, the system comprising:
   an operating system; and
   a multi-core processor, wherein the multi-core processor is configured to be in communication with a memory and the operating system, wherein the operating system is configured to:
   determine a cache miss rate of a particular core in the multi-core processor, wherein the cache miss rate includes a number of times, within a time period, that a particular memory controller fetches data from the memory in response to the data being absent in a cache associated with the particular core in a particular tile of the multi-core processor;

compare the cache miss rate of the particular core with a first threshold value and a second threshold value, wherein the first threshold value is lower than the second threshold value;

determine a category of the thread based on the comparison wherein the determining comprises determining that the category of the thread is latency-bound, responsive to a determination that the cache miss rate is greater than the first threshold value and less than the second threshold value; and assign the thread to the particular core using a latency-sensitive protocol based on cost that is based on at least one of the cache miss rate and a proximity table, responsive to the determination that the category of the thread is latency-bound.

8. The system of claim 7, wherein determining the category of the thread based on the comparison further comprises determining that the category of the thread is bandwidth-bound, responsive to a determination that the cache miss rate is greater than the second threshold value, and wherein the operating system is configured to assign the thread to the particular core using a bandwidth-sensitive protocol based at least in part on a number of hops between the particular core and the particular memory controller, responsive to the determination that the category of the thread is bandwidth-bound.

9. The system of claim 8, wherein determining the category of the thread based on the comparison further comprises determining that the category of the thread is neither latency-bound nor bandwidth-bound, responsive to a determination that the cache miss rate is less than the first threshold value, and wherein the operating system is configured to assign the thread to the particular core using one of the latency-sensitive protocol or the bandwidth-sensitive protocol, responsive to the determination that the category of the thread is neither latency-bound nor bandwidth-bound.

10. The multi-core processor of claim 7, wherein the operating system is further configured to:

select a first core or a second core, included in the multi-core processor, as the particular core; and select a first memory controller or a second memory controller as the particular core, wherein the selection of the first core or the second core as the particular core, and the selection of the first memory controller or the second memory controller as the particular memory controller, are based on a first cost, a second cost, a third cost, and a fourth cost, and wherein:

the first cost includes a cost to communicate between the first core and the first memory controller, the second cost includes a cost to communicate between the first core and the second memory controller, the third cost includes a cost to communicate between the second core and the first memory controller, and the fourth cost includes a cost to communicate between the second core and the second memory controller.

11. The multi-core processor of claim 10, wherein the first, second, third, and fourth costs are based on a number of hops between a respective core and a respective memory controller.

12. The multi-core processor of claim 11, wherein the number of hops includes a number of routers.

13. A method to generate an instruction to assign a thread to a particular core in a multi-core processor, wherein the multi-core processor includes a plurality of cores, the method comprising:

determining a category of the thread wherein the determining comprises:

determining a cache miss rate of the particular core in the multi-core processor, wherein the cache miss rate represents a number of times, within a time period, that the selected particular memory controller fetches data from a memory in response to the data being absent in a cache associated with the particular core in a particular tile of the multi-core processor;

comparing the cache miss rate of the particular core with at least one of a first threshold value and a second threshold value, wherein the first threshold value is lower than the second threshold value; and determining the category of the thread as latency-bound, responsive to a determination that the cache miss rate is greater than the first threshold value and less than the second threshold value;

generating a first instruction to assign the thread to the particular core using a latency-sensitive protocol based on cost that is based on at least one of the cache miss rate and a proximity table, responsive to determination that the category of the thread is latency-bound;

selecting a particular memory controller, of a plurality of memory controllers, based on a proximity between the particular memory controller and the particular core;

identifying memory addresses assigned to the selected particular memory controller; and generating a second instruction to store data associated with the thread in the identified memory addresses.

14. The method of claim 13, wherein determining the category of the thread further comprises:

determining that the category of the thread is bandwidth-bound, responsive to a determination that the cache miss rate is greater than the second threshold value; and generating the first instruction to assign the thread to the particular core comprises generating the first instruction to assign the thread using a bandwidth-sensitive protocol, responsive to the determination that the category of the thread is bandwidth-bound.

15. The method of claim 14, wherein generating the first instruction to assign the thread to the particular core comprises:

generating the first instruction to assign the thread to the particular core using any of the latency-sensitive protocol and the bandwidth-sensitive protocol, responsive to determination that the category of the thread is neither latency-bound nor bandwidth-bound when the cache miss rate is less than the first threshold value.

16. The method of claim 15, wherein the latency-bound protocol includes a specification to reduce at least one of data access time of the thread, a transmission distance between the particular core and the selected particular memory controller, and a cost of data access.

17. The method of claim 15, wherein the bandwidth-bound protocol includes a specification to increase a data access rate.

18. The method of claim 13, wherein generating the second instruction to store the data associated with the thread in the identified memory addresses comprises generating an instruction to migrate pages of the data associated with the thread to page frames that have a same color as the selected particular memory controller.

* * * * *